Figure 3:
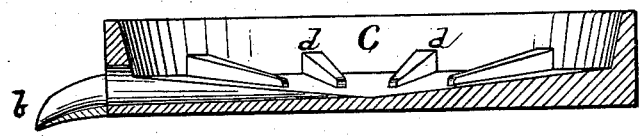

2 Sheets--Sheet 1.
J. A. CLARK.
Drip-Pan for Barrels.
No: 163,360. Patented May 18, 1875.
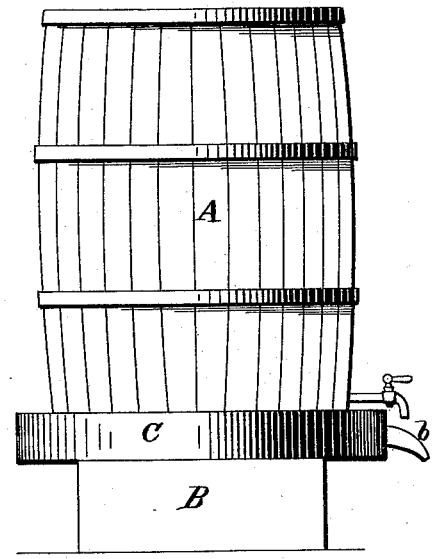
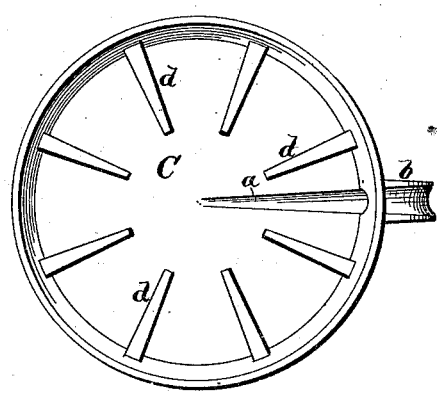
Witnesses:
W. H. Duhamel
Thomas Byrne
Inventor:
Jno. A. Clark.
Per H. S. Abbot.
Attorney.
THE GRAPHIC CO.PHOTO-LITH.39 & 41 PARK PLACE,N.Y.

2 Sheets--Sheet 2.

J. A. CLARK.
Drip-Pan for Barrels.

No. 163,360. Patented May 18, 1875.

Witnesses:
J. T. Du Hamel.
Thomas Byrne.

Inventor:
John. A. Clark
Per H. T. Abbot
Attorney.

THE GRAPHIC CO.PHOTO-LITH.39 & 41 PARK PLACE,N.Y.

UNITED STATES PATENT OFFICE.

JOHN A. CLARK, OF NEWARK, NEW JERSEY.

IMPROVEMENT IN DRIP-PANS FOR BARRELS.

Specification forming part of Letters Patent No. 163,360, dated May 18, 1875; application filed September 3, 1874.

*To all whom it may concern:*

Be it known that I, JOHN A. CLARK, of Newark, county of Essex and State of New Jersey, have invented certain new and useful Improvements in Drip-Pans for Barrels, of which the following is a specification:

The nature of my invention consists in the construction and arrangement of a drip pan or base for barrels containing kerosene oil or other fluids, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a side elevation of a cask or barrel with my drip-pan underneath, and Fig. 2 is a plan view of the drip-pan. Fig. 3 is a transverse sectional view of the drip-pan, showing the drainage of the same.

A represents a cask or barrel, such as are used to contain kerosene oil or other fluid, and from which such fluid is to be drawn as wanted.

In stores these casks or barrels are generally placed on end upon an open bench, B, of suitable height. It often happens, even before they are half emptied, they commence to leak, causing not only the soiling of the floor, but also considerable loss.

To obviate this difficulty is the object of my invention, and to this end I have constructed a shallow circular pan, C, of larger diameter than the end of the cask or barrel intended to be placed therein. The under side of the bottom of the pan C is perfectly flat, so as to rest upon the bench B, or upon any other suitable support. The upper side of the bottom inclines slightly downward from the circumference toward the center, and a groove, $a$, is formed in the bottom leading out through a spout, $b$, on one side of pan. On the upper surface of the bottom are tapering ribs $d\,d$, at equal distances apart, extending radially from the rim of the pan inward, to a suitable distance from the center. The cask or barrel A is to stand in this pan, and rest upon the ribs $d\,d$, leaving a space between the cask and the bottom of the pan. The pan will catch all the drip or leakage from the cask, and the fluid thus caught will flow toward the center of the pan, and then into and through the groove $a$ and spout $b$ out into any vessel placed for its reception. The loss from leakage is thus prevented, as well as the annoyance of soiling the floor therewith.

The drip-pan may be cast all in one piece, or otherwise made of any suitable material.

Having thus fully described my invention, what I claim as new, and desire to secure by Letters Patent, is—

The drip-pan C, having an imperforate or solid bottom inclined on the inside toward and provided with groove $a$, having spout $b$, and radial ribs $d$, substantially as and for the purpose set forth.

In testimony that I claim the foregoing as my invention I hereunto affix my signature this 29th day of August, 1874.

JOHN A. CLARK.

Witnesses:
WM. E. D. FRANKS,
WM. P. PARKER.